United States Patent
Tutt et al.

(10) Patent No.: US 6,363,239 B1
(45) Date of Patent: *Mar. 26, 2002

(54) PRINT HAVING ATTACHED AUDIO DATA STORAGE AND METHOD OF PROVIDING SAME

(75) Inventors: Lee W. Tutt, Webster; Robert W. Spurr, Rochester; Babak Tehranchi, Rochester; Kurt M. Sanger, Rochester; Timothy J. Tredwell, Fairport, all of NY (US)

(73) Assignee: Eastman Kodak Company, Rochester, NY (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/372,442

(22) Filed: Aug. 11, 1999

(51) Int. Cl.⁷ .................................................. G09B 5/00
(52) U.S. Cl. .................................. 434/317; 340/825.49
(58) Field of Search ........................ 340/825.49, 825.52, 340/825.54, 825.56; 455/92, 101; 434/308, 317, 318

(56) References Cited

U.S. PATENT DOCUMENTS

| | | |
|---|---|---|
| 3,835,301 A | 9/1974 | Barney |
| 4,075,018 A | 2/1978 | Custer |
| 4,178,183 A | 12/1979 | Ciurca, Jr. et al. |
| 4,208,210 A | 6/1980 | Sakai et al. |
| 4,270,853 A | 6/1981 | Hatada et al. |
| 4,270,854 A | 6/1981 | Stemme et al. |
| 4,600,280 A | 7/1986 | Clark |
| 4,806,958 A | 2/1989 | Momot et al. |
| 4,855,769 A | 8/1989 | Slavitter et al. |
| 4,905,029 A | 2/1990 | Kelley |
| 4,983,996 A | 1/1991 | Kinoshita |
| 4,990,092 A | 2/1991 | Cummings |
| 5,030,544 A | 7/1991 | Olbrechts et al. |
| 5,059,126 A | 10/1991 | Kimball |
| 5,184,152 A | 2/1993 | French |
| 5,185,315 A | 2/1993 | Sparer |
| 5,268,708 A | 12/1993 | Harshbarger et al. |
| 5,290,190 A | 3/1994 | McClanahan |
| 5,297,881 A | 3/1994 | Ishiyama |
| 5,305,020 A | 4/1994 | Gibbons et al. |
| 5,310,999 A * | 5/1994 | Claus et al. ........... 340/825.52 |
| 5,313,235 A | 5/1994 | Inoue et al. |
| 5,331,338 A | 7/1994 | Mager |

FOREIGN PATENT DOCUMENTS

| | | |
|---|---|---|
| NL | A 9400392 | 3/1994 |
| WO | WO 98/40930 | 3/1998 |

OTHER PUBLICATIONS

Trademark Registration Data for "Tag It" from USPTO website. Trademark Registered Apr. 15, 1997.*
TEMIC Semiconductors, "Read/Write Transponder", Apr. 30, 1997, 1(9) and 2(9).
TEMIC Semiconductors, "Standard Read/Write Identification IC", Mar. 17, 1998, 1(15)–11(15).

*Primary Examiner*—Sam Rimell
(74) *Attorney, Agent, or Firm*—Walter S. Stevens; Norman Rushefsky

(57) ABSTRACT

A print having attached audio data storage and method of providing same. A print, generated by an image processing apparatus, has an attached memory with recorded audio data related to the print, which memory allows contactless access to the data using an electromagnetic frequency signal. A transceiver communicates with a transponder that is attached to the print substrate and is integrally coupled to the memory. The transponder is capable of receiving a first electromagnetic frequency from the transceiver and deriving power and address information from the first frequency, then generating a second electromagnetic frequency in response, where the second electromagnetic frequency is characteristic of the recorded audio data stored in memory.

31 Claims, 4 Drawing Sheets

U.S. PATENT DOCUMENTS

| | | |
|---|---|---|
| 5,342,671 A | 8/1994 | Stephenson |
| 5,426,011 A | 6/1995 | Stephenson |
| 5,455,617 A | 10/1995 | Stephenson et al. |
| 5,491,327 A | 2/1996 | Saroya |
| 5,493,385 A | 2/1996 | Ng |
| 5,513,920 A | 5/1996 | Whritenor et al. |
| 5,516,590 A | 5/1996 | Olmstead et al. |
| 5,521,663 A | 5/1996 | Norris, III |
| 5,528,222 A | 6/1996 | Moskowitz et al. |
| 5,528,377 A | 6/1996 | Hutcheson |
| 5,532,727 A | 7/1996 | Agano et al. |
| 5,547,501 A | 8/1996 | Maruyama et al. |
| 5,562,352 A | 10/1996 | Whritenor et al. |
| 5,565,906 A | 10/1996 | Schoon |
| 5,574,519 A | 11/1996 | Manico et al. |
| 5,598,201 A | 1/1997 | Stodder et al. |
| 5,600,350 A | 2/1997 | Cobbs et al. |
| 5,600,352 A | 2/1997 | Knierim et al. |
| 5,606,347 A * | 2/1997 | Simpson ................ 340/825.49 |
| 5,620,265 A | 4/1997 | Kondo |
| 5,625,391 A | 4/1997 | Hirabayashi et al. |
| 5,644,557 A | 7/1997 | Akamine et al. |
| 5,647,679 A | 7/1997 | Green et al. |
| 5,661,515 A | 8/1997 | Hevenor et al. |
| 5,713,288 A | 2/1998 | Frazzitta |
| 5,774,752 A | 6/1998 | Patton et al. |
| 5,842,118 A * | 11/1998 | Wood, Jr. ................... 455/101 |
| 5,878,292 A | 3/1999 | Bell et al. |
| 5,914,671 A * | 6/1999 | Tuttle .................... 320/825.54 |

\* cited by examiner

PRINT HAVING ATTACHED AUDIO DATA STORAGE AND METHOD OF PROVIDING SAME

FIELD OF THE INVENTION

This invention generally relates to prints processed by image processing apparatus and more particularly relates to a print having attached audio data storage and method of providing same.

BACKGROUND OF THE INVENTION

It can be appreciated that for a monochrome or color print, such as a photograph, the viewer's experience of and appreciation of the print is enhanced when recorded sound is associated with the print and can be played-back as the print is viewed. A recorded sound associated with a photograph in an album, for example, can be a recorded voice message, or a short segment of recorded music, or even background sound recorded when the photograph was taken.

For example, U.S. Pat. No. 5,290,190 to McClanahan and U.S. Pat. No. 4,990,092 to Cummings disclose a "talking book", wherein recorded sound associated with a page or picture can be played-back when a button is pushed.

Similarly, U.S. Pat. No. 5,574,519 to Manico, et al. discloses a bound "talking photo album" that allows recorded sound associated with an individual photograph to be played back when a photograph is placed in a viewer or scanned using an optical wand.

In addition, U.S. Pat. No. 4,905,029 to Kelley discloses a camera adapted to record sound onto a magnetic strip that is integrally attached to a photograph. A photograph produced by the device is inserted into a reader (which may be part of the camera body itself) for playing back the sound.

Similarly, U.S. Pat. No. 4,270,854 to Stemme et al. discloses a camera for recording sound data on a magnetic strip that is attached to an instant camera print.

With respect to the Kelly and Stemme et al. devices, a magnetic strip, preferably attached to the photograph, is the primary means for recording audio associated with a photograph. However, disadvantages of this arrangement include the limited expected lifespan of magnetic recording media, difficulty of reproducing and reprinting photographs so configured, and possibility of erasure of the recorded audio by stray magnetic fields. Moreover, magnetic film is susceptible to damage in handling, and scratches or dirt on the magnetic material can render the medium unreadable. In addition, storage capability of a magnetic strip is severely limited, constraining the recorded message to within a few seconds duration at best. Further, magnetic media is typically passed through a reader device in order to swipe the media within a precise distance of a read head. This raises the need to provide precise manufacturing tolerances for the reader device, which in turn increases manufacturing costs.

Another method for audio storage with a photographic print includes encoding the audio signal digitally and providing the encoded signal in optically readable form. In this regard, U.S. Pat. No. 4,600,280 to Clark discloses use of optical encoding to store an audio signal on a transparent film, such as is used for motion pictures.

Employing a similar concept for opaque photographic prints, U.S. Pat. No. 5,521,663 to Norris discloses optical encoding for an opaque print, in which a camera is adapted to record sound onto the photographic film itself using optical encoding.

Disadvantages of the Clark and Norris devices include the requirement to print encoded audio information as part of the imageable area of the film, reducing the overall usable area for the image. Further, in order to obtain the encoded data, the imaged area containing the encoding must be precisely scanned by an optical reader, thereby leading to relatively complex reader components. Yet another disadvantage is that optical encoding does not provide a useful method for subsequent erasure and re-recording of an audio segment.

On the other hand, storage of audio data on an integrated circuit (IC) memory has advantages over magnetic storage and optical storage. Use of an integrated circuit memory that contains a digitally encoded audio signal and that is attached to a photographic print is disclosed in U.S. Pat. No. 5,774,752 to Patton et al.

In addition, U.S. Pat. No. 4,905,029 to Kelley discloses use of an attached IC memory chip as an alternative audio storage method, where the chip stores the audio data for access from an external magnetic read head. The IC chip disclosed in U.S. Pat. No. 4,905,029 receives its source power from the external read head by means of induction coils connected to the chip. The coils allow chip circuitry to obtain sufficient current (from the magnetic field exerted by the read head) to power memory and logic support circuitry internal to the chip. It is important to note that this arrangement presents a number of limitations. Among these are the following:

(a) A magnetic read head must be passed within very close proximity to the IC memory chip (within a fraction of an inch of the chip), and with the proper orientation relative to the chip, in order to provide power to and to communicate with the chip. This is due to the nature of electromagnetic induction, since a "closed" magnetic circuit is required for transformer action. Thus, while this method provides "contactless" communication, it is required that a viewer pass a read head within close proximity to the chip.

(b) A ferromagnetic shield would be needed to confine interaction between a read head device and one IC chip at a time. Otherwise, where a grouping contains multiple prints having corresponding IC chips, a read head could inadvertently activate more than one IC memory chip. In a photo album, for example, this would require the cumbersome solution of using a backing sheet of ferromagnetic material placed behind a print for which an audio signal is to be obtained.

All of the aforementioned solutions for storing and retrieving audio data associated with a print present disadvantages when usability and cost are considered. Solutions using magnetic strips require either handling of the print, passing the print through a reader, or passing a read head in close proximity to the magnetic strip surface. Similarly, solutions using optical encoding require a print, in proper orientation, to be scanned using a wand or other reading device. Other solutions that would require connection to an IC on the print itself present additional problems. In this regard, connectors add cost and present potential reliability problems from dust and dirt and wear problems due to repeated connection/disconnection duty cycles.

For contactless communication, RFID (Radio Frequency IDentification) tags having an integrally attached memory are commercially available. Currently, RF ID tags are used in applications when it is useful to store unique identifying information associated with an item in a manner such that the information is attached to the item. For example, RF ID tags have been proposed for use in applications with passports and credit cards, such as is disclosed in U.S. Pat. No. 5,528,222 to Moskowitz et al.

A commercially available RFID tag is the "TAG-IT™ INLAY", manufactured by Texas Instruments, Incorporated, located in Dallas, Tex., USA, can be used to provide information related to a device to which it is attached. This thin, flexible type of RF ID tag can be used, for example, in an application that previously employed a label or bar code. The applications noted in U.S. Pat. No. 5,528,222 and the "TAG-IT™ INLAY" are primarily for identification purposes, such as for employee badges, for inventory control, or for credit card account identification. However, these devices are not used for storing audio or audio-related information.

Thus, it is seen that while there are advantages to storing, as part of a photographic print, audio data associated with that print, there are no satisfactory solutions that allow storage of such audio data in a durable, reproducible, and re-recordable form. In addition, the prior art apparently does not disclose devices or methods that allow contactless read/write access which can be initiated from a variable position relative to a print and over a variable distance from a print, for the purpose of storage and retrieval of audio associated with an image on the print.

SUMMARY OF THE INVENTION

It is an object of the present invention to provide a print having audio data attached thereto, wherein the audio data can be recorded onto the print or played back upon initiation by an observer.

According to an aspect of the present invention, a print substrate has an attached non-volatile semiconductor memory component that is integrally connected to a transponder. The memory component may be, for example, an EEPROM (Electrically Erasable Programmable Read-Only Memory). Stored in the memory component are encoded data for a digitally encoded, recorded audio segment. A transceiver generates a first electromagnetic frequency that provides source power for the transponder. When it receives the first electromagnetic frequency, the transponder generates a second electromagnetic frequency in response to the first electromagnetic frequency. The second electromagnetic frequency is conditioned by the stored recorded audio segment stored in the memory.

According to another aspect of the present invention, a print substrate has an attached non-volatile semiconductor memory component, integrally connected to a transponder, which stores a digital address that indicates where a recorded audio segment for a specific print is located. When it receives the first electromagnetic frequency, the transponder generates a second electromagnetic frequency in response to the first electromagnetic frequency. The second electromagnetic frequency is conditioned by the stored recorded address for an audio signal stored on a device.

A feature of the present invention is the ability of a transceiver to act as a "writer" that stores, on a memory that is attached to the print substrate, recorded audio or information on the storage location of recorded audio.

Another feature of the present invention is the ability of the transceiver to act also as a "reader" that retrieves stored audio information from the memory.

An advantage of the present invention that it allows an audio signal that is uniquely associated with a print to be integrally attached to the print for automated play-back.

Another advantage of the present invention that it provides a contactless communication interface, accessing recorded audio or related data without requiring that electrical contact be made to corresponding contacts mounted on a print.

A further advantage of the present invention that it allows a print having attached recorded audio to be easily reproduced, because audio data is stored in digitized form.

These and other objects, features, and advantages of the present invention will become apparent to those skilled in the art upon a reading of the following detailed description when taken in conjunction with the drawings wherein there are shown and described illustrative embodiments of the invention.

BRIEF DESCRIPTION OF THE DRAWINGS

While the specification concludes with claims particularly pointing out and distinctly claiming the subject matter of the present invention, it is believed the invention will be better understood from the following description when taken in conjunction with the accompanying drawings, wherein:

DETAILED DESCRIPTION OF THE INVENTION

The present description is directed in particular to elements forming part of, or cooperating more directly with, apparatus in accordance with the invention. It is to be understood that elements not specifically shown or described may take various forms well known to those skilled in the art.

For the description that follows, the general term "print" is used to indicate an output image from an image processing apparatus, reproduced onto a substrate, where the image is reproduced using a colorant such as ink or dyes, or using exposure methods well known in the art. By way of example only, and not by way of limitation, a print, as the term is used herein and as generally numbered 30 in the following description, could be any of the following:

a photographic print;

a printed output sheet, such as from a proofing system, including digital proofing systems that use thermal print technologies, from inkjet printers, or from photofinishing printers that use photosensitive film or paper that is exposed to a light source and developed using a subsequent chemical process for creating an image;

a developed X-ray, ultrasound, or other diagnostic image; or an aerial photograph.

A substrate, generally numbered 42 in the following description, may be any suitable material and is typically found in sheet form and can include, for example, generally opaque materials such as paper, cardboard, textile, and vinyl, or generally transparent materials such as film, or other materials capable of accepting a printed image.

The recorded audio, also termed "audio segment" herein, can originate from any of a number of possible sources. For example, the audio can be recorded at the time a photograph is taken. This would be possible, for example, using a camera as disclosed in U.S. Pat. No. 5,128,700 to Inoue et al. Or, a separately recorded audio segment can be provided, recorded into memory by a technician when a print is developed. As yet another example, recorded audio can be programmed by a customer after receiving the developed print.

Figure 1:
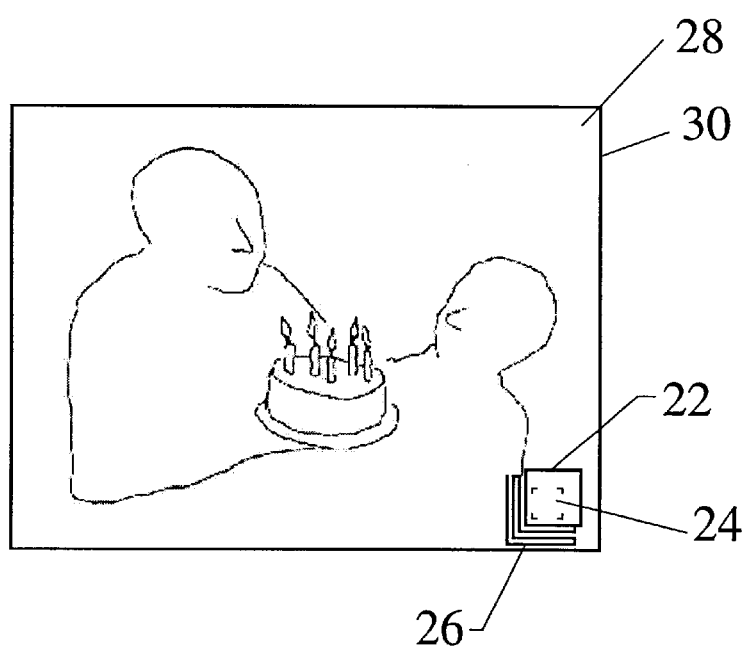
FIG. 1 is a plan view of a print having a transponder coupled to the print.

FIG. 1 shows a transponder 22 attached to a print 30, imaged onto a paper substrate 28. Transponder 22 may be a "TAG-IT™ INLAY" which incorporates a memory 24, an antenna 26, and internal RF communication and power supply circuitry (not shown). Transponder 22 can be attached to the front or back of print 30 using an adhesive-tape backing, laminated onto print 30, embodied within paper substrate 28 or attached using an alternate arrangement such as described herein below.

Referring again to FIG. 1, transponder 22 is shown attached along an edge of paper substrate 28, away from the image area of print 30. This is only one possible arrangement, because transponder 22 can be attached in any suitable position on print 30, including on the back side of print 30.

Figure 2:
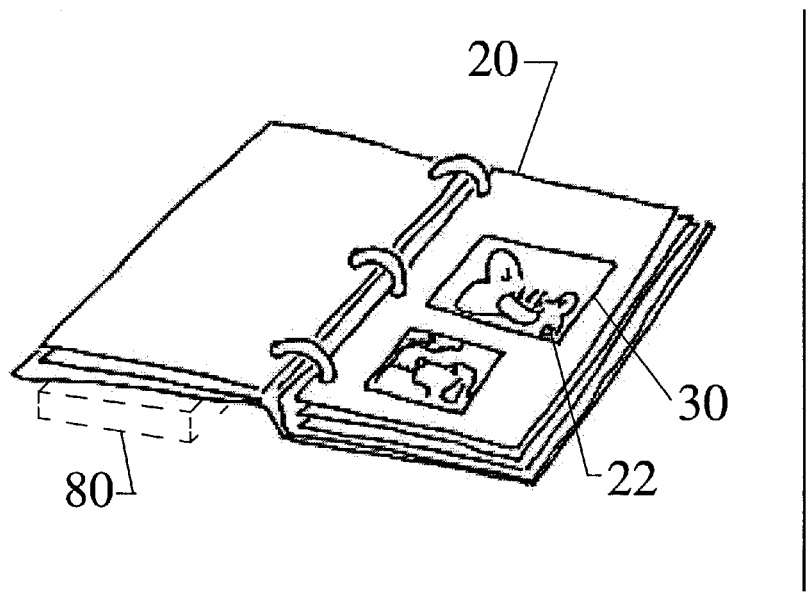
FIG. 2 is a perspective view showing prints arranged in an album, each print having an attached memory that stores a pointer to recorded audio data that is stored on a separate component within the album.

FIG. 2 shows print 30 having attached transponder 22 disposed in an album 20. With this arrangement, a separate audio storage and playback unit 80 (shown in dotted outline in FIG. 2) may be part of album 20. In this configuration of the invention, it is possible to store the recorded audio for a print 30 on a magnetic tape or other storage device that is attached to album 20. This arrangement would allow transponder 22 on print 30 to store only minimal data indicating an address or pointer to recorded audio that is stored on audio storage and playback unit 80.

Recording/Retrieving Audio Data

Figure 3:
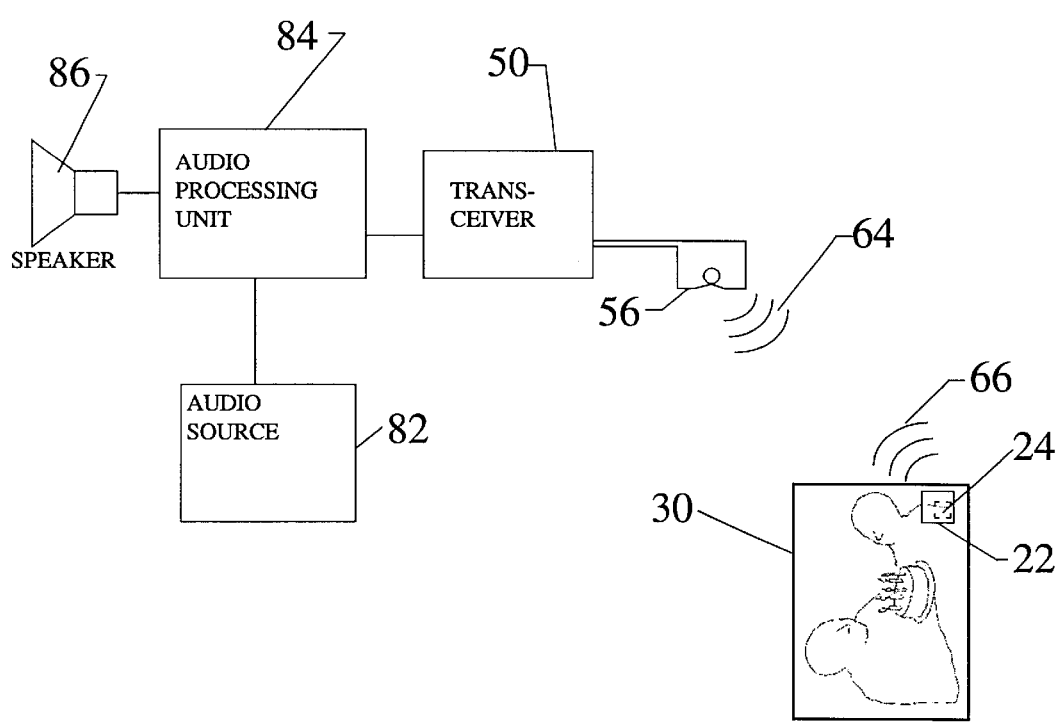
FIG. 3 is a schematic view showing components used to store or retrieve recorded audio on a print.

It is instructive to describe how audio data can be recorded into memory 24 on print 30 or retrieved from memory 24. FIG. 3 shows, in schematic form, a system for storing or retrieving recorded audio from a print 30 having transponder 22 coupled thereto.

Referring to FIG. 3, a transceiver 50 connects to an antenna 56. Transceiver 50 may be, for example, a "HOUSED READER AND ANTENNA" transceiver, part number RI-K01-320A-00, available from Texas Instruments, Incorporated, located in Dallas, Tex., USA. In operation, transceiver 50 is capable of transmitting a first electromagnetic frequency 64 of a first predetermined frequency, for reasons disclosed presently. Transceiver 50 is also capable of receiving a second electromagnetic frequency 66 of a second predetermined frequency, for reasons disclosed presently.

Notably, communication at a predetermined frequency, by means of antenna 56, between transceiver 50 and transponders 22 can take place over a variable distance. For typical low-power RF devices such as the aforementioned "TAG-IT INLAY"™, the distance between antenna 56 and transponder 22 can range from very close proximity to as far as 18 inches. However, greater distances are possible, using correspondingly higher levels of RF output power. Moreover, antenna 56 can have any orientation relative to the position of transponder 22, provided that communication frequencies 64 and 66 are not impeded by shielding.

Transponder 22 is a low-power device that is tuned to a carrier frequency emitted by transceiver 50. This carrier frequency is in the Radio Frequency (RF) range. However, the carrier frequency could alternately be in another frequency range, for example, at a microwave frequency. Upon receiving an initial signal from transceiver 50, transponder 22 circuitry obtains, from the emitted electromagnetic energy, sufficient energy to provide source voltage for its internal circuitry. This is advantageous because no battery is needed to separately power transponder 22.

Each transponder 22 can be individually programmed with a unique identifying address code (ID). Transponder 22 may be manually attached to print 30 at a final assembly or at any print processing stage. Other attachment methods are possible, as described herein below.

Transceiver 50 has both read and write access to memory data stored in memory 24 on transponder 22. To communicate with transponder 22, transceiver 50 encodes a unique identifying address code as part of its emitted signal, along with a command to read data from or to write data to (i.e., program) memory 24 of transponder 22. Transponder 22 responds to transceiver 50 communication when it has been addressed using the correct encoded ID.

Data is transferred between transceiver 50 and transponder 22 by modulation of the respective electromagnetic frequency. By way of illustration, modulation of first electromagnetic frequency 64 could employ, for example, Amplitude Modulation (AM), Frequency Modulation (FM), Frequency-Shift Keying (FSK), or other means for encoding the address of data transfer to or from memory 24 in transponder 22. To program memory 24, transceiver 50 encodes the following information during its transmission of first electromagnetic frequency 64:

(a) a command to write data to memory 24;

(b) an address of the data to be written in memory 24; and, (c) the data for storage at the address specified at address (b) above in memory 24.

It is important to note that the data for storage listed as (c) immediately herein above can be a complete audio segment, digitally encoded and compressed, for example. Alternately, the data for storage in memory 24 can itself be an address, or "pointer" to a memory location on a separate storage device, as described subsequently.

Referring again to FIG. 3, second electromagnetic frequency 66, transmitted by transponder 22 in response to first electromagnetic frequency 64, is conditioned by the data stored in memory 24. That is, transponder 22 applies modulation to second electromagnetic frequency 66 that is sent in response to first electromagnetic frequency 64. Transceiver 50 extracts the data encoded in returned electromagnetic frequency 66. This data can either be a complete digitized audio signal, or can simply be a data pointer serving as an address to a location on a separate storage device where the corresponding audio for print 30 is separately stored.

Referring again to FIG. 3, transceiver 50 is electrically coupled to an audio processing unit 84. Audio processing unit 84 may operate in either of two ways:

(1) If a complete audio segment is stored in memory 24 on transponder 22, process (amplify) the audio segment for the viewer and direct this signal to speaker 86.

(2) If the data stored in memory 24 on transponder 22 is a pointer to a stored recorded audio segment, access the stored audio for replay to the viewer.

Figure 4:
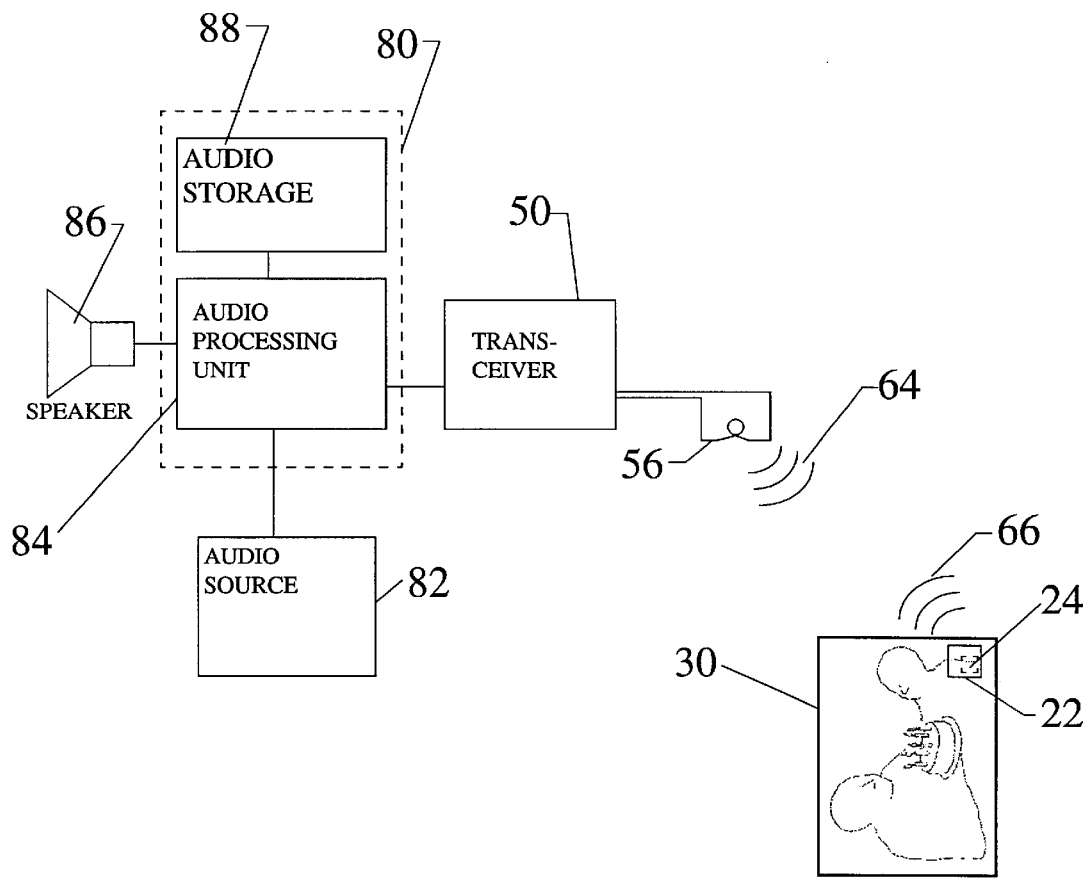
FIG. 4 is a schematic view showing components used in an alternative embodiment of the present invention, in which the audio segment is stored separately from the print.

FIG. 4 shows the additional components that would be used listed in case (2) immediately hereinabove where the data returned from memory 24 is a pointer to stored recorded audio. Here, the recorded audio is stored in audio storage 88, as part of audio storage and playback unit 80. When it receives the pointer information from memory 24, audio processing unit 84 provides the pointer information to audio storage 88. Audio storage 88 responds by providing the audio segment back to audio processing unit 84 for playback on speaker 86.

Referring to FIGS. 3 and 4, there are a number of possible embodiments for the transceiver 50 and antenna 56 components. For example, these components can be hand-held. Antenna 56 could be fabricated in the form of a "wand" to be waved toward print 30 when it is desired to play back the corresponding audio. Audio source 82 provides the audio segment for storage in memory 24. Audio source 82 can include audio that was originally recorded on the film negative (for example, using the mechanism disclosed in U.S. Pat. No. 4,905,029) or in memory circuitry when a photograph is taken (for example, using the mechanism disclosed in U.S. Pat. No. 5,128,700) or could originate from another other audio input device.

Audio Data Format

An audio segment, either stored directly in memory 24 or separately in audio storage 88, can be digitally stored in any one of a number of possible data formats. By way of example only, and not by way of limitation, audio data could be provided in WAV (Waveform Audio) format, familiar to users of well known operating systems for personal computers. Where it is desirable to store a sequence of discrete-frequency musical tones for playback (rather than more complex audio having voice components or recorded sound) a MIDI (Musical Instrument Digital Interface) file format can be utilized. MIDI files are very compact when contrasted with sound storage formats. Compression methods could also be employed to reduce the size of stored audio segments, thereby extending the length of the playback interval available.

Methods of Attachment for Transponder 22

Transponder 22, as is the case with a "TAG-IT INLAY"™, may be provided on adhesive-backed material for attachment to print substrate 28. Of course, other modes of attachment are possible and are considered within the scope of the present invention.

As one method of attachment, transponder 22 can be laminated onto print 30. Alternately, transponder 22 can be embedded within print 30 during manufacture of paper substrate 28.

Antenna 26 is integrally connected to transponder 22. However, antenna 26 can be separately provided on a substrate material. This arrangement would then allow transponder 22 to be handled separately and affixed to print 30 after an audio segment is programmed.

Multiple Prints 30 in an Album 20

Where multiple prints 30 are stored in album 20, it may be necessary to provide isolation in some form so as to restrict communication to only a single transponder 22 at a time. That is, it is necessary to prevent a "collision" condition in which two or more transponders 22 simultaneously respond to first electromagnetic frequency 64 as was described using FIGS. 3 and 4. Where RF frequencies are used for communication, shielding could take the form of thin aluminum sheets placed between prints, for example. However, other methods are available using programming techniques that allow communication with a single transponder 22 at a time. As one example, an alternative polling technique employs a "non-collision" algorithm developed for communicating with multiple transponders grouped in a confined area. In one embodiment of such a technique, an algorithm uses a computational loop that proceeds in steps to increase transceiver 50 output power from an initially low value as transceiver 50 repeatedly polls for a transponder 22.

As soon as transceiver 50 detects one of the transponders 22, transceiver 50 communicates with that transponder 22 and then temporarily disables that transponder 22. Transceiver 50 can then repeat polling in this fashion, incrementing its output power level slightly with each polling operation, to sequentially locate, communicate with, and then temporarily disable each next available transponder 22. In this way, transceiver 50 communicates with multiple transponders 22 in order of their return signal strength, until each transponder 22 on a page of album 20 has been contacted.

While the invention has been described with particular reference to its preferred embodiments, it will be understood by those skilled in the art that various changes may be made and equivalents may be substituted for elements in the preferred embodiments without departing from the scope of the invention. For texample, audio processing unit 84 can be a component of a desktop computer, as might be appropriate when the audio message is initially stored in memory 24. Memory 24 can be provided in read/write form or can be write-protected, allowing read-only access to audio data stored on print 30. In addition, transponder 22 could be automatically attached to print 20 or could be provided for attachment by an operator of printing equipment as part of a post-printing or finishing process. Or, transponder 22 could be built into paper substrate 28 itself and could thereby be "invisible" to an operator or user of the print.

There are also a number of possible alternate arrangements for integrating antenna 26 onto or within a print substrate. For example, antenna 26 could be imprinted onto a surface of the substrate. Or, antenna 26 could be integrated into a substrate material, as part of the receiver manufacture or processing.

Therefore, what is provided is a print having an attached data storage and allowing contactless access to stored data (e.g., audio data) associated with the print.

PARTS LIST

20. Album
22. Transponder
24. Memory
26. Antenna
28. Paper substrate
30. Print
32. Computer
50. Transceiver
56. Antenna
64. First electromagnetic frequency
66. Second electromagnetic frequency
68. Signal interface
70. Speaker
80. Audio storage and playback unit
82. Audio source
84. Audio processing unit
86. Speaker
88. Audio storage

What is claimed is:

1. A storage apparatus for storing audio related data on an output print produced by an image processing apparatus, comprising:
   (a) a memory coupled to the output print, said memory having audio related data associated with the image stored therein, the audio related data being in the form of a digitally encoded audio file or in the form of a pointer that identifies a digitally encoded audio file located external to the memory;
   (b) a transponder integrally coupled with said memory, said transponder capable of receiving a first electromagnetic energy of a first frequency and, in response to the first electromagnetic energy of the first frequency received thereby, generating a second electromagnetic energy of a second frequency, the second electromagnetic energy of the second frequency being characteristic of the data stored in said memory, said transponder being operable so that the energy of the first frequency provides the power to generate the electromagnetic energy of the second frequency without battery power being available to the transponder;

(c) a transceiver spaced-apart from the output print for transmitting said electromagnetic energy of the first frequency and for sensing the electromagnetic energy of the second frequency; and (d) a data processing unit coupled to said transceiver, said data processing unit adapted to communicate with said transceiver for facilitating exchange of the data between said transceiver and said memory.

2. The storage apparatus of claim 1, wherein said transceiver transmits the electromagnetic energy of the first frequency at a predetermined first frequency.

3. The storage apparatus of claim 1 wherein said transceiver receives the electromagnetic energy of the second frequency at a predetermined second frequency.

4. The storage apparatus of claim 1, further comprising an audio storage unit spaced apart from the output print, said audio storage unit storing a digitally encoded file associated with the image and wherein the memory stores audio related data in the form of a pointer that identified the digitally encoded audio file in the audio storage unit.

5. The storage apparatus of claim 4, wherein said data processing unit is an audio data processing unit and said output print is stored in a photo album.

6. The storage apparatus of claim 1, wherein said data processing unit is a computer.

7. The storage apparatus of claim 1, further comprising an audio storage unit spaced apart from the output print, said audio storage unit adapted to store audio data associated with the image.

8. A print, comprising:

(a) a substrate;

(b) a memory coupled to said substrate, said memory having audio related data stored therein, the audio related data in the form of a digitally encoded audio file or in the form of a pointer that identifies a digitally encoded audio file; and (c) a transponder integrally coupled with said memory, said transponder capable of receiving electromagnetic energy of a first frequency and, in response to the electromagnetic energy of the first frequency received thereby, generating electromagnetic energy of a second frequency, the electromagnetic energy of the second frequency being characteristic of the data stored in said memory, said transponder being operable so that the energy of the first frequency provides the power to generate the electromagnetic energy of the second frequency without battery power being available to the transponder.

9. The print of claim 8, further comprising an antenna coupled to said transponder.

10. The print of claim 8, wherein said memory has stored therein audio related data in the form of a pointer that identifies a digitally encoded audio file that is external to the memory.

11. The print of claim 8, wherein said memory has stored therein audio related data in the form of a digitally encoded audio file.

12. The print of claim 8, wherein said memory has stored therein audio related data in the form of a pointer that identifies a digitally encoded audio file.

13. The print of claim 8, wherein said memory is a read/write memory.

14. The print of claim 12, wherein said print is stored in a photo album and the album includes a digitally encoded audio file to which said pointer points.

15. The print of claim 8, wherein said substrate is film.

16. A method of assembling a storage apparatus for storing audio related data on an output print produced by an image processing apparatus, comprising the steps of:

(a) coupling a memory to the output print, the memory storing audio related data associated with the image, the audio related data being in the form of a digitally encoded audio file or in the form of a pointer that identifies a digitally encoded audio file;

(b) integrally coupling a transponder with the memory, said transponder capable of receiving electromagnetic energy of a first frequency and, in response to the electromagnetic energy of the first frequency received thereby, generating electromagnetic energy of a second frequency, the electromagnetic energy of the second frequency being characteristic of the data stored in said memory, said transponder being operable so that the energy of the first frequency provides the power to generate the electromagnetic energy of the second frequency without battery power being available to the transponder;

(c) providing a transceiver adapted to be spaced-apart from the output print for transmitting the first electromagnetic frequency and for sensing the second electromagnetic frequency; and (d) coupling a data processing unit to the transceiver, the data processing unit adapted to communicate with the transceiver for facilitating exchange of the data between the transceiver and the memory.

17. The method of claim 16, wherein the step of providing a transceiver comprises the step of providing a transceiver adapted to transmit the electromagnetic energy of the first frequency at a predetermined first frequency.

18. The method of claim 16, wherein the step of providing a transceiver comprises the step of providing a transceiver adapted to receive the electromagnetic energy of the second frequency at a predetermined second frequency.

19. The method of claim 16, wherein the step of coupling a memory comprises the step of coupling a memory that has stored therein audio data in the form of a pointer that identifies a digitally encoded audio file external to the memory.

20. The method of claim 19, wherein the step of coupling a data processing unit comprises the step of coupling an audio data processing unit.

21. The method of claim 16, wherein the step of coupling an audio data processing unit comprises the step of coupling a computer.

22. The method of claim 19, further comprising the step of disposing an audio storage unit spaced apart from the output print, the audio storage unit storing a digitally encoded audio file to which the pointer points.

23. A method of reading data on a print, comprising the steps of:

(a) providing a substrate on which an image is printed;

(b) providing a memory integral with the substrate, the memory having audio related data stored therein in the form of a digitally encoded audio file or in the form of the pointer that identifies a digitally encoded audio file; and (c) operating a transponder that is integral with the memory, the transponder receiving electromagnetic energy of a first frequency and, in response to the electromagnetic energy of the first frequency received thereby, generating electromagnetic energy of a second frequency, the electromagnetic energy of the second frequency being characteristic of the data stored in said memory, said transponder being operable so that the energy of the first frequency provides the power to generate the electromagnetic energy of the second frequency without battery power being available to the transponder.

24. The method of claim 23, farther comprising the step of receiving energy by an antenna that is electrically coupled to the transponder.

25. The method of claim 23, wherein the memory has audio related data stored therein in the form of a digitally encoded audio file and an antenna in the form of a wand is waved towards the print when it is desired to playback the audio file.

26. The method of claim 23, wherein the memory has audio related data stored therein in the form of a digitally encoded audio file.

27. The method of claim 26, wherein the memory has audio related data stored therein in the form of a pointer that identifies a digitally encoded audio file.

28. The method of claim 23, wherein the memory comprises a read/write memory.

29. The method of claim 23, wherein the step of providing a substrate comprises the step of providing a paper substrate.

30. The method of claim 23 and wherein the print is stored in an album with others of said prints and a transceiver outputs power from an initially low value to increasing values of power to repeatedly poll a transponder of one of the prints in order to establish communication with that transponder.

31. A method of reading data on a print, comprising the steps of:

(a) providing a substrate on which an image is printed;

(b) providing a memory integral with the substrate, the memory adapted to store data therein;

(c) operating a transponder that is integral with the memory, the transponder receiving electromagnetic energy of a first frequency and, in response to the electromagnetic energy of the first frequency received thereby, generating electromagnetic energy of a second frequency, the electromagnetic energy of the second frequency being characteristic of the data stored in said memory, said transponder being operable so that the energy of the first frequency provides the power to generate the electromagnetic energy of the second frequency without battery power being available to the transponder; and wherein the print is stored in an album with others of said prints and a transceiver outputs power from an initially low value to increasing values of power to repeatedly poll a transponder of one of the prints in order to establish communication with that transponder.

\* \* \* \* \*